(12) United States Patent
Aoshima et al.

(10) Patent No.: US 6,255,749 B1
(45) Date of Patent: Jul. 3, 2001

(54) MOTOR

(75) Inventors: Chikara Aoshima, Zama; Akira Kurosawa, Yokoze-machi, both of (JP)

(73) Assignees: Canon Kabushiki Kaisha, Tokyo; Canon Denshi Kabushiki Kaisha, Saitama-ken, both of (JP)

( * ) Notice: Subject to any disclaimer, the term of this patent is extended or adjusted under 35 U.S.C. 154(b) by 0 days.

(21) Appl. No.: 09/536,755

(22) Filed: Mar. 28, 2000

(30) Foreign Application Priority Data

Mar. 30, 1999 (JP) .................................................. 11-087680
Mar. 30, 1999 (JP) .................................................. 11-087681

(51) Int. Cl.[7] .......................... H02K 37/00; H02K 37/10; H02K 1/12
(52) U.S. Cl. ................................. 310/49 R; 310/40 MM; 310/254
(58) Field of Search ............................... 310/49 R, 156, 310/268, 194, 254, 91, 90, 40 MM; 29/596–598

(56) References Cited

U.S. PATENT DOCUMENTS

| | | | |
|---|---|---|---|
| 3,361,947 | * 1/1968 | Schlebusch | 310/12 |
| 4,806,813 | 2/1989 | Sumi et al. | 310/254 |
| 4,958,099 | 9/1990 | Chigira et al. | 310/254 |
| 5,384,506 | 1/1995 | Aoshima | 310/49 R |
| 5,486,054 | * 1/1996 | Nagata et al. | 384/610 |
| 5,831,356 | 11/1998 | Aoshima | 310/49 R |
| 5,886,438 | * 3/1999 | Kawanishi | 310/49 R |
| 5,925,945 | 7/1999 | Aoshima | 310/49 R |
| 5,945,753 | 8/1999 | Maegawa et al. | 310/68 B |
| 5,969,453 | 10/1999 | Aoshima | 310/156 |
| 5,973,425 | 10/1999 | Aoshima | 310/49 R |
| 5,977,678 | * 11/1999 | Miller et al. | 310/103 |
| 6,046,517 | 4/2000 | Sasaki et al. | 310/40 M |

* cited by examiner

*Primary Examiner*—Tran Nguyen
(74) *Attorney, Agent, or Firm*—Fitzpatrick, Cella, Harper & Scinto

(57) ABSTRACT

A motor includes a magnet formed in a cylindrical shape and divided in the circumferential direction in at least the outer periphery and alternately polarized to different poles, a first coil, a magnet and a second coil placed in the axial direction of the magnet, a first outer magnetic pole opposed to the outer periphery of the magnet and a hollow-shaped first inner magnetic pole opposed to the inner periphery of the magnet, excited by the first coil respectively, a second outer magnetic pole opposed to the outer periphery of the magnet and a hollow-shaped second inner magnetic pole opposed to the inner periphery of the magnet, excited by the second coil respectively, a rotatable rotary shaft integral with the magnet, and a pressurizing device for pressurizing the rotary shaft in the axial direction, the pressurizing device being placed in the hollow cylindrical portion of the first inner magnetic pole. A motor having a high output, a compact shape and small working noises is provided.

12 Claims, 6 Drawing Sheets

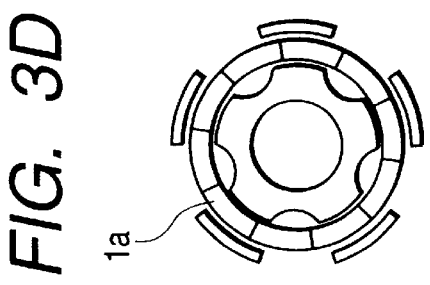
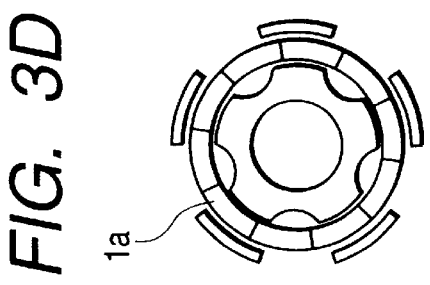
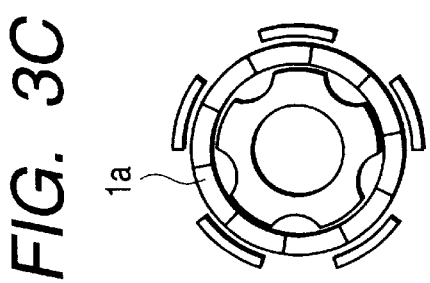
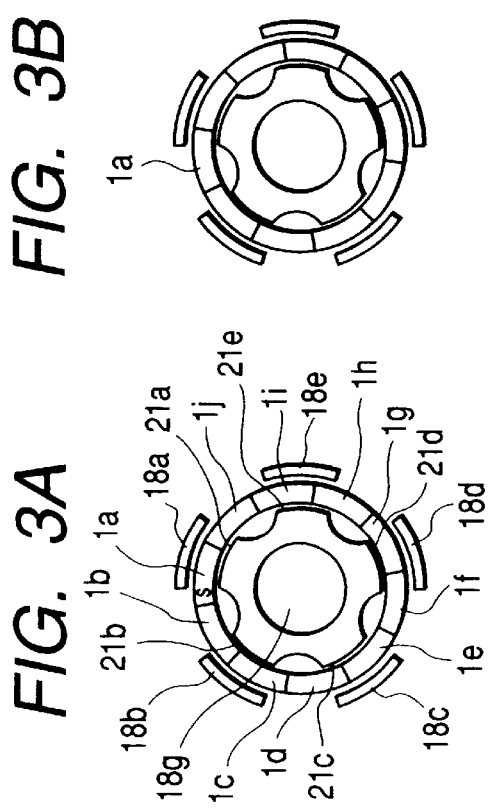
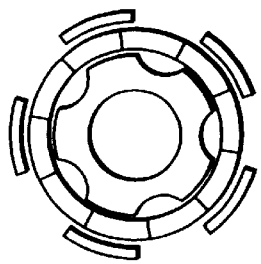
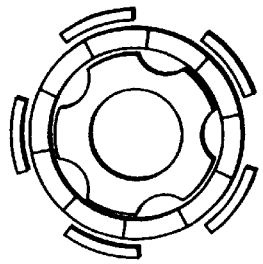
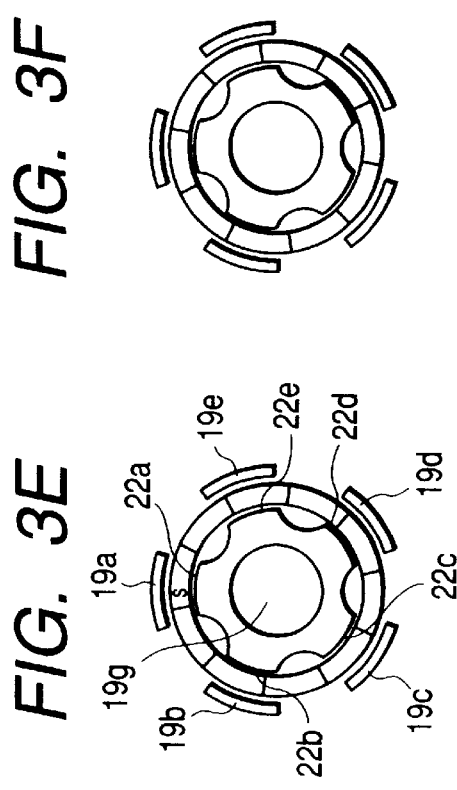

MOTOR

BACKGROUND OF THE INVENTION

1. Field of the Invention

The present invention relates to a motor formed in an ultra-compact shape.

2. Related Background Art

A motor formed as a compact motor is conventionally well known as, for example, a compact cylindrical step motor shown in FIG. 7. A stator 102 of the step motor is formed in such a manner that a stator coil 105 is coaxially wound around a bobbin 101, the bobbin is stationarily sandwiched between two stator yokes 106 in the axial direction, stator teeth 106a and 106b are alternately placed on the stator yoke 106 in the circumferential direction of the bobbin along the inner surface thereof, and that the stator yoke 106 integrated to the stator tooth 106a or 106b is fixed to the case 103.

A flange 115 and a bearing 108 are fixed to one of two cases 103 and another bearing is fixed to the other case. A rotor 109 is composed of a rotor magnet 111 fixed to a rotor shaft 110. The rotor magnet is rotatably supported between two bearings 108.

A mechanism has been proposed in which a leadscrew is formed on the rotor shaft 110, and the leadscrew engages with a female thread (not shown) to move the female thread in the axial direction. The mechanism is used in, for example, an autofocus mechanism of a video camera.

However, since, in the above-mentioned conventional step motor, the case 3, bobbin 101, stator coil 105, and the stator yoke 106 are coaxially placed on the outer periphery of the rotor, such a disadvantage that the outside dimension of motor becomes large arose. Further, since magnetic flux, which is generated by energization to the stator coil, is mainly passed through an end surface 106a 1 of a stator tooth 106a and an end surface 106b1 of a stator tooth 106b as shown in FIG. 8, it does not effectively act on a rotor magnet 111. Accordingly, the output of motor was not increased.

A motor that solved such problems is known in U.S. Pat. No. 5,831,356. The motor is formed in such a manner that a permanent magnet rotor divided into equal parts in the circumferential direction and alternately polarized into different poles is formed in a cylindrical shape, a first coil, the rotor and a second coil are placed in the axial direction of the rotor, a first outer magnetic pole and a first inner magnetic pole excited with the first coil are opposingly placed on the outer periphery and the inner periphery of the rotor, respectively, and a second outer magnetic pole and a second inner magnetic pole excited with the second coil are opposingly placed on the outer periphery and the inner periphery of the rotor, respectively. A rotary shaft that is a rotor shaft is extended from within the cylindrical permanent magnet.

Thus formed, the motor may have a high output and a small outside dimension. Nevertheless, if, by thinning the magnet in such configuration the distance between the first outer magnetic pole and the first inner magnetic pole and the distance between the second outer magnetic pole and the second inner magnetic pole are decreased, the magnetic resistance of a magnetic circuit, may be decreased. Accordingly, current which is passed through the first coil and the second coil enables the generation of increased magnetic flux in a reduced amount of current.

Further, when a conventional motor shown in FIG. 7 is applied to such a mechanism that a leadscrew is formed in the output shaft, the leadscrew is allowed to engage with a female thread to move the female thread in the axial direction, pressurization of the output shaft or rotor shaft in the axial direction to bias the output shaft or the rotor shaft in the axial direction is needed so that a hysteresis difference is not generated. This pressurizing means is usually a plate-shaped spring and is placed on the rear end surface of the motor body. Therefore, a length the entire motor including the pressurizing means becomes longer and the compactness of motor is lost. Further, looseness between the rotor shaft and the bearing portion generates a larger working noise.

SUMMARY OF THE INVENTION

In consideration of the above-mentioned circumstances an object of the present invention is to provide a high power and ultra-compact motor formed by mounting a pressurizing means in the axial direction of the output shaft on an inner side of an inner yoke.

Another object of the present invention is to provide a pressurizing means in which a contact surface of the pressurizing means with the output shaft has a shape that enables generation of a smaller working noise.

Still another object of the present invention will become apparent from concrete examples described below.

BRIEF DESCRIPTION OF THE DRAWINGS

FIGS. 3A, 3B, 3C, 3D, 3E, 3F, 3G and 3H are views explaining the rotary operation of a rotor of the motor shown in FIG. 2;

DESCRIPTION OF THE PREFERRED EMBODIMENTS

Examples of the present invention will be described with reference to drawings below.

Although Example 1 of the present invention will be described below, the basic configuration of a step motor according to the present invention is described with reference FIGS. 1, 2, 3A to 3H and 4.

Figure 1:
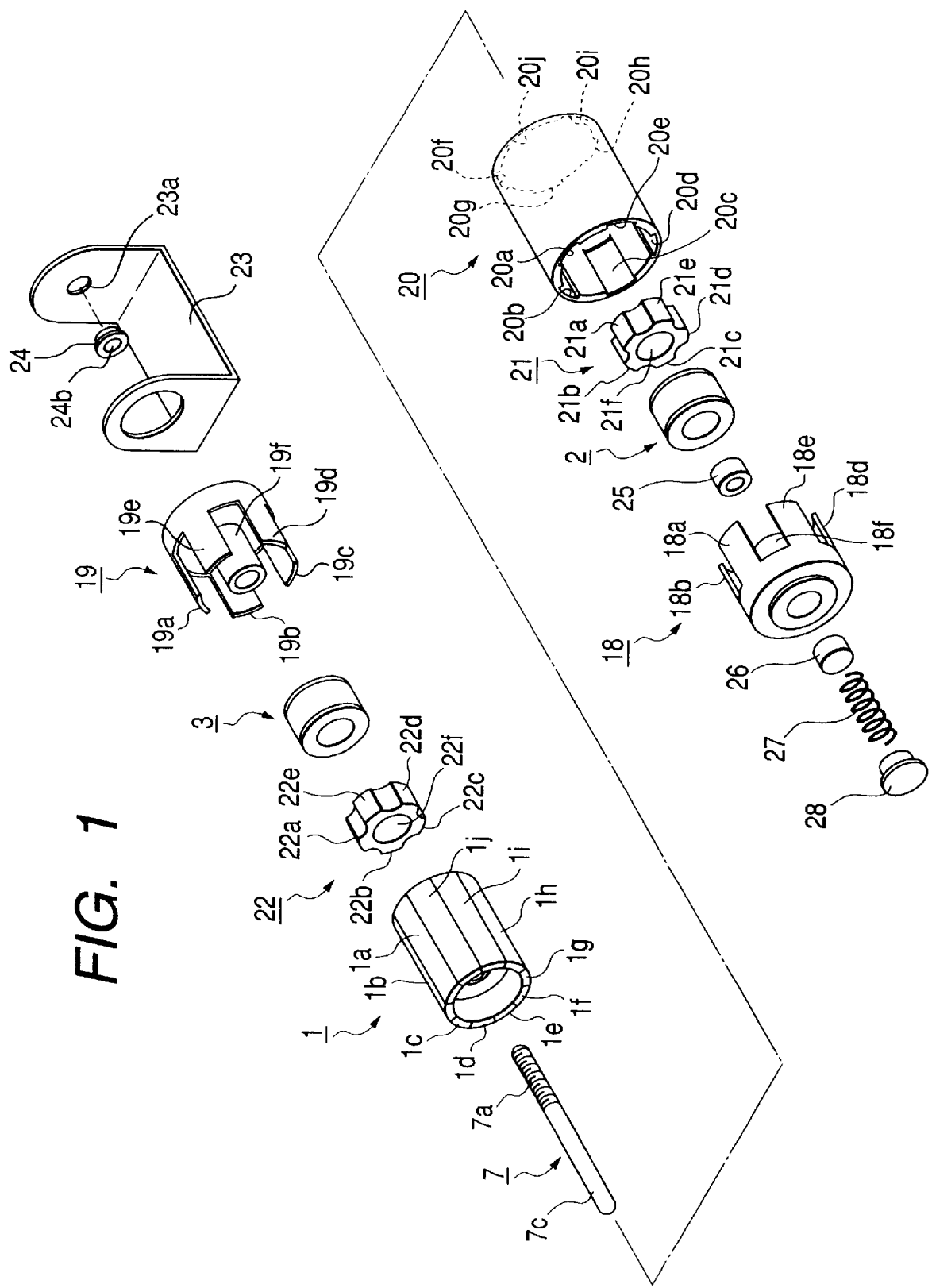
FIG. 1 is an exploded perspective view of a motor according to Example 1 of the present invention.
Figure 2:
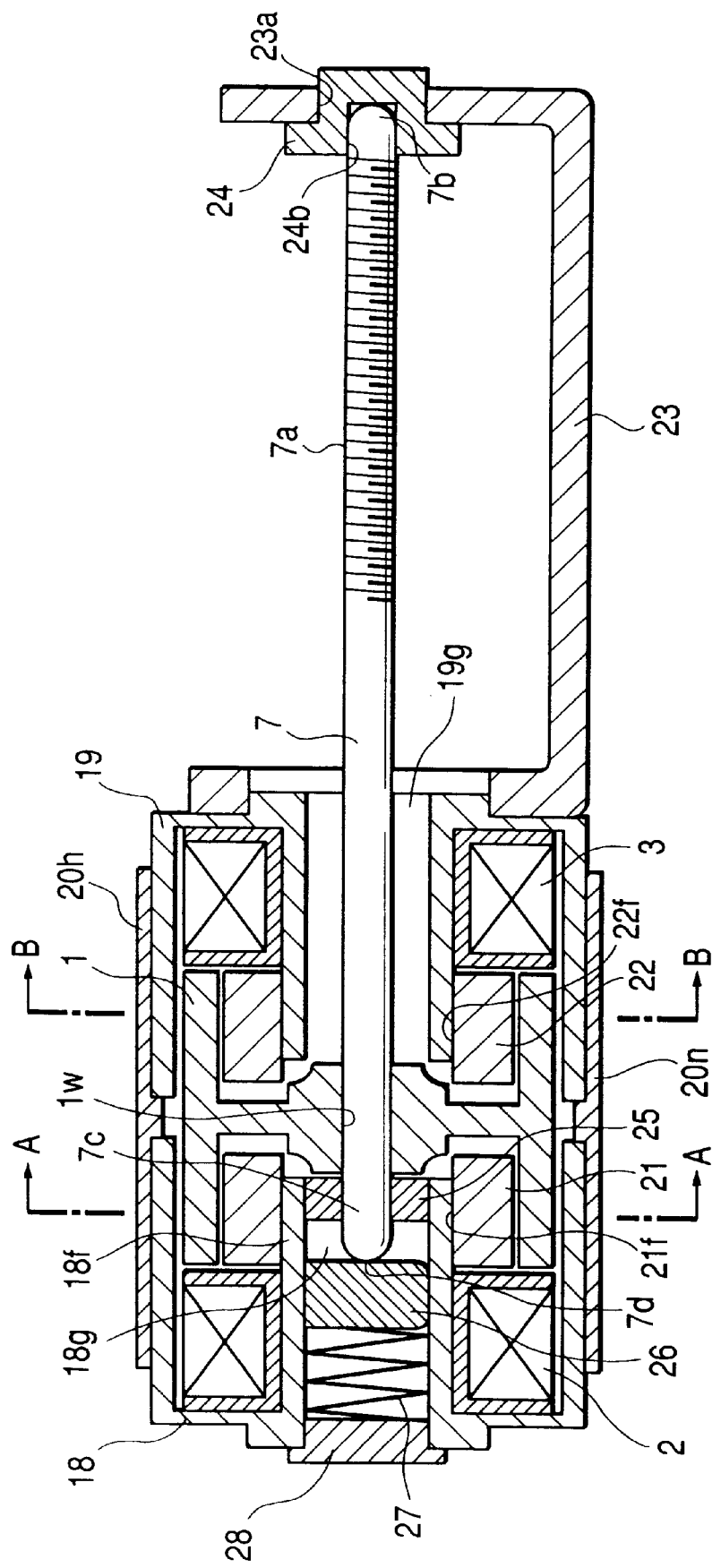
FIG. 2 is a cross-sectional view in assembly of the motor shown in FIG. 1.
Figure 4:
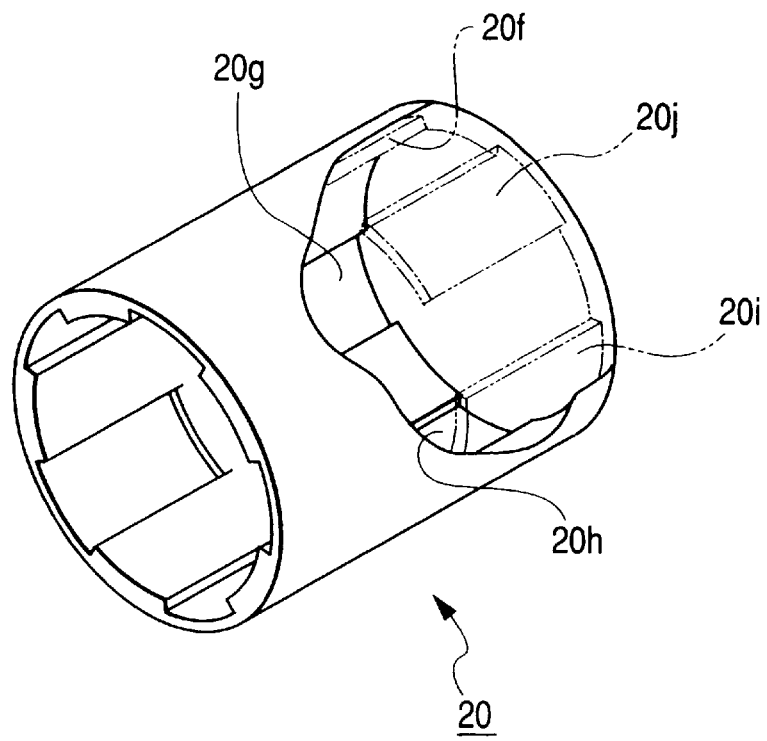
FIG. 4 is a perspective view showing a connecting ring shown in FIG. 2 while a part of the ring is cut out.

FIG. 1 is an exploded perspective view of a step motor, FIG. 2 is a cross-sectional view of an assembled step motor in the axial direction, FIGS. 3A to 3D are cross-sectional views taken along the line A—A and FIGS. 3E to 3H are cross-sectional views taken along the line B—B in FIG. 2, and FIG. 4 is a perspective view of a connecting ring partially shown with a cross-section.

In FIGS. 1, 2, 3A to 3H and 4, the reference numeral 1 denotes a cylindrical magnet. In the magnet 1 that is a rotor, the outer periphery is divided into n parts (ten parts in the present example) to form polarized portions 1a, 1b, 1c, 1d, 1e, 1f, 1g, 1h, 1i, and 1j alternately polarized by the S pole and the N pole. The polarized portions 1a, 1c, 1e, 1g, and 1i are polarized by the S poles and the polarized portions 1b, 1d, 1f, 1h, and 1j are polarized by the N poles. Further, the magnet 1 is made of a plastic magnet material formed by injection molding. Thus, the thickness in the radial direction of the cylindrical magnet 1 may be significantly reduced. Further, the magnet 1 is provided with a fitting portion 1w having a small inner diameter in the center portion in the axial direction.

The reference numeral 7 denotes an output shaft used as a rotor shaft. On the output shaft 7 is formed a leadscrew portion 7a. The leadscrew portion 7a engages with a female thread (not shown) and linearly moves the female thread by rotation. The leadscrew portion 7a corresponds to a transmission means in claims. This output shaft 7 is fitted into the fitting portion 1w of the magnet 1 that is a rotor by press-fitting. Since the magnet 1 is made of a plastic magnet material formed by injection molding, a crack does not occur even in assembly by press-fitting and even such a complicated shaped magnet 1 as to provide the fitting portion 1w having a small inner diameter in the axial direction can be easily produced. Further, the output shaft 7 and the magnet 1 form a rotor.

The reference numerals 2 and 3 denote cylindrical coils. The coils 2 and 3 are coaxial with the magnet 1 and are placed at positions sandwiching the magnet 1 in the axial direction. The outer diameters of coils 2 and 3 are substantially the same as that of said magnet 1 in size.

The reference numerals 18 and 19 denote a first stator and a second stator made of a soft magnetic material. The first stator 18 and the second stator 19 are placed in such a manner that the phases of the first stator and second stator are shifted by 180/n degrees that is 18°. The first stator 18 and the second stator 19 are each composed of an outer case and a hollow-shaped case. The outer case of the first stator 18 forms the first outer magnetic poles 18a, 18b, 18c, 18d, and 18e in the leading end.

The reference numerals 21 denotes a first auxiliary stator. An inner diameter portion 21f of the first auxiliary stator 21 is fitted into and fixed to an inner case 18f of the first stator 18. Further, on the outer diameter portion of the first auxiliary stator 21 are formed opposed portions 21a, 21b, 21c, 21d, and 21e arranged at phases opposed to the outer magnetic poles 18a, 18b, 18c, 18d, and 18e of the first stator 18. The opposed portions 21a, 21b, 21c, 21d, and 21e are formed in such a manner that they are each shifted by 360/n degrees, that is, 72° to become the same phase with respect to polarization of the magnet 1. Further, the first outer magnetic poles 18a, 18b, 18c, 18d, and 18e of the first stator 18 are formed in such a manner that they are each shifted by 360/n degrees, that is, 72° to become the same phase with respect to polarization of the magnet 1. The hollow-shaped inner case 18f of the first stator 18 and the auxiliary stator 21 form a first inner pole.

The outer case of the second stator 19 forms the second outer magnetic poles 19a, 19b, 19c, 19d, and 19e in the leading end.

The reference numerals 22 denotes a second auxiliary stator. An inner diameter portion 22f of the second auxiliary stator 22 is fitted into and fixed to an inner case 19f of the second stator 19. Further, on the outer diameter portion of the first auxiliary stator 22 are formed opposed portions 22a, 22b, 22c, 22d, and 22e arranged at phases opposed to the outer magnetic poles 19a, 19b, 19c, 19d, and 19e of said second stator 19. The opposed portions 22a, 22b, 22c, 22d, and 22e are formed in such a manner that they are each shifted by 360/(n/2) degrees, that is, 72° to become the same phase with respect to polarization of the magnet 1. Further, the second outer magnetic poles 19a, 19b, 19c, 19d, and 19e of the second stator 19 are formed in such a manner that they are each shifted by 360/(n/2) degrees, that is, 72° to become the same phase with respect to polarization of the magnet 1.

The hollow-shaped inner case 19f of the second stator 19 and the auxiliary stator 22 form a second inner pole.

The outer magnetic poles 18a, 18b, 18c, 18d, and 18e of the first stator 18, and the outer magnetic poles 19a, 19b, 19c, 19d, and 19e of the second stator 19 are formed by cutouts and teeth extending in a direction parallel to the axis. This configuration enables a formation of magnetic poles while having a minimum diameter of the motor. That is, when an outer magnetic pole is formed by concave and convex portions extending in the radial direction, the diameter of motor becomes large by the extension. However, since, in the present embodiment, an outer magnetic pole is formed by a cutout and a tooth extending in a direction parallel to the axis, the diameter of motor can be reduced to a minimum.

The outer magnetic poles 18a, 18b, 18c, 18d, and 18e of the first stator 18 and the outer diameter portions 21a, 21b, 21c, 21d, and 21e of the first auxiliary stator forming a part of the first inner magnetic poles are opposingly provided on the outer periphery and the inner periphery of magnet on one end side thereof so that they sandwich the one end side.

The outer magnetic poles 19a, 19b, 19c, 19d, and 19e of the second stator 19 and the outer diameter portions 22a, 22b, 22c, 22d, and 22e of the second auxiliary stator forming a part of the second inner magnetic poles are opposingly provided on the outer periphery and the inner periphery of magnet on the other end side thereof so that they sandwich the other end side.

Between the outer case and inner case of the first stator 18 is provided a coil 2. By energization of this coil 2 the first stator 18 and the first auxiliary yoke 21 are excited.

Also, between the outer case and inner case of the second stator 19 is provided a coil 3. By energization of this coil 3 the second stator 19 and the second auxiliary yoke 22 are excited.

Therefore, the magnet flux generated with coil 2 is passed through the magnet 1 that is a rotor positioned between the outer magnetic poles 18a, 18b, 18c, 18d, and 18e and the opposed portions 21a, 21b, 21c, 21d, and 21e forming a part of the inner magnetic poles, the magnetic flux acts on the magnet, which is a rotor, effectively thereby enhancing an output of the motor.

The first inner magnetic poles have an outer diameter larger than the inner diameter of the first coil, and have an outer diameter larger than the inner diameter of said second coil. Accordingly, even if the inner diameter of coil is decreased and the volume of the coil is increased, the distance between the first outer magnetic pole and the first inner magnetic pole and the distance between the second outer magnetic pole and the second inner magnetic pole can be formed. Accordingly, since magnetic resistance for the coil can be decreased, even small power enables generation of a large amount of magnetic flux thereby enhancing the output of motor.

The reference numeral 20 denotes a connecting ring that is a cylindrical member made of a non-magnetic material. The details of the connecting ring 20 are shown as a perspective view with a partial cutout in FIG. 4. On one inner end side of this connecting ring 20 are provided grooves 20a, 20b, 20c, 20d, and 20e, and on the other inner end side thereof are provided grooves 20f, 20g, 20h, 20i, and 20j phase-shifted by 180/n degrees that is 18° with respect to grooves 20a, 20b, 20c, 20d, and 20e. To the grooves 20a, 20b, 20c, 20d, and 20e are fitted into the outer magnetic poles 18a, 18b, 18c, 18d, and 18e of the first stator 18, and to the grooves 20f, 20g, 20h, 20i, and 20j are fitted into the outer magnetic poles 19a, 19b, 19c, 19d, and 19e of the second stator 19, and these members are fixed with adhesive therebetween. These first stator 18 and second stator 19 are fixed with a gap of a certain distance due to inner side projected portions 20k and 20n of the connecting ring 20.

That is, the first stator 18 and the second stator 19 are placed so that the leading ends of the outer magnetic poles 18a, 18b, 18c, 18d, and 18e of the first stator 18 are opposed to the leading ends of the outer magnetic poles 19a, 19b, 19c, 19d, and 19e of the first stator 19, respectively. Since the connecting ring 20 is made of a non-magnetic material, the first stator 18 and the second stator 19 can be separated in a magnetic circuit without influencing each other, whereby performance of a motor can be stabilized.

The reference numeral 23 denotes a frame, which is fixed to the second stator 19. The reference numeral 24 denotes a leading end bearing, which is fixed to a hole 23a of the frame 23. A leading end portion 7b of said rotor shaft 7 is rotatably fitted into a cavity 24b of the leading end bearing 24. The reference numeral 25 denotes a stator inner shaft bearing, which is mounted on a leading portion of the hollow cylindrical inner case 18f of the first stator 18, and to which a portion 7c of the rotor shaft 7 is rotatably fitted. Thus, the rotor shaft 7 is rotatably supported with the leading end bearing 24 and the stator inner bearing 25. That is, the leadscrew portion 7a, which is a transmission means for transmitting power to the outside, is projected in the axial direction beyond an inner portion 19g of the inner case 19f of the second stator 19 on the opposite side of the first stator 18 on which the stator inner bearing 25 was mounted. The leadscrew portion 7a is positioned between the second stator 19 and the leading end bearing 24. Therefore, since the transmission means has a structure supported with bearings on both sides, a merit of increase in supporting strength is obtained in addition to merits described later. The reference numeral 26 denotes a slide member, which is mounted on an inner portion 18g of the hollow cylindrical inner case 18f of the first stator 18. The reference numeral 28 denotes a lid, which is fixed to the first stator 18 and regulates a position in a direction on one side of a compression coil spring 27.

The compression coil spring 27 pressurizes an end portion 7d of the rotor shaft 7 in the axial direction through said slide member 26. The rotor shaft 7 can be rotated while being pressurized against said leading end bearing 24 side, and is registered with respect to a position in the axial direction. Therefore, the movement position of a linear motion of a female thread, which engages with the leadscrew portion 7a of the rotor shaft 7, is moved stably so that a hysteresis difference, due to the rotary direction of rotor shaft 7 or the like, does not occur.

In the present embodiment, the compression coil spring 27 and the slide member 26 form a pressurizing means. Since this pressurizing means is mounted on the inner portion 18g of the hollow cylindrical inner case 18f of the first stator 18, it does not protrude from the motor body or lose a compactness of motor. Further, if, after mounting the compression coil spring 27 and the slide member 26 on the inner portion 18g of the hollow cylindrical inner case 18f of the first stator 18, the stator inner bearing 25 and the lid 28 are fixed to the first stator 18, movement of the compression coil spring 27 and the slide member 26 is regulated with the stator inner bearing 25 even before assembly of the rotor shaft 7 and does not exit the inner portion 18g of the hollow cylindrical inner case of the first stator 18, whereby the merit of enhancing the working efficiency during assembly can be obtained.

Further, even if the pressurizing means composed of the compression coil spring 27 and the slide member 26 imparted a side pressure to the rotor shaft 7 without pressurizing the rotor shaft 7 correctly in the axial direction, a portion of the rotor shaft 7, which is pressurized, is supported with the stator inner bearing 25 in the vicinity of the portion. Accordingly, generation of a moment of force due to the side pressure can be prevented to a low level and looseness for the rotor shaft and a side pressure imparted to a bearing and the like can be prevented to minimum, whereby an output of the motor can be stabilized and generation of working noises can be decreased.

Between the outer case and inner case of the first stator 18 is provided a coil 2. By energization of this coil 2 the first stator 18 and the first auxiliary yoke 21 are excited.

Also, between the outer case and inner case of the second stator 19 is provided a coil 3. By energization of this coil 3 the second stator 19 and the second auxiliary yoke 22 are excited. Therefore, the magnet flux generated with coil 2 is passed through the magnet 1 that is a rotor positioned between the outer magnetic poles 18a, 18b, 18c, 18d, and 18e and the opposed portions 21a, 21b, 21c, 21d, and 21e forming a part of the inner magnetic poles, the magnetic flux acts on the magnet, which is a rotor, effectively thereby enhancing an output of the motor.

The first inner magnetic poles have an outer diameter larger than the inner diameter of said first coil, and have an outer diameter larger than the inner diameter of the second coil. Accordingly, even if the inner diameter of coil is decreased and the volume of the coil is increased, the distance between the first outer magnetic pole and the first inner magnetic pole and the distance between the second outer magnetic pole and the second inner magnetic pole can be formed. Accordingly, since magnetic resistance for the coil can be decreased, even small power enables generation of a large amount of magnetic flux thereby enhancing the output of motor.

The reference numeral 20 denotes a connecting ring that is a cylindrical member made of a non-magnetic material. The details of the connecting ring 20 is shown as a perspective view with a partial cutout in FIG. 4. On one inner end side of this connecting ring 20 are provided grooves 20a, 20b, 20c, 20d, and 20e, and on the other inner end side thereof are provided grooves 20f, 20g, 20h, 20i, and 20j phase-shifted by 180/n degrees that is 18° with respect to grooves 20a, 20b, 20c, 20d, and 20e. To the grooves 20a, 20b, 20c, 20d, and 20e are fitted into the outer magnetic poles 18a, 18b, 18c, 18d, and 18e of the first stator 18, and to the grooves 20f, 20g, 20h, 20i, and 20j are fitted into the outer magnetic poles 19a, 19b, 19c, 19d, and 19e of the second stator 19, and these members are fixed with adhesive therebetween. These first stator 18 and second stator 19 are fixed with a gap of a certain distance due to inner side projected portions 20k and 20n of the connecting ring 20.

That is, the first stator 18 and the second stator 19 are placed so that the leading ends of the outer magnetic poles 18a, 18b, 18c, 18d, and 18e of the first stator 18 are opposed to the leading ends of the outer magnetic poles 19a, 19b, 19c, 19d, and 19e of the first stator 19, respectively. Since the connecting ring 20 is made of a non-magnetic material, the first stator 18 and the second stator 19 can be separated in a magnetic circuit without influencing each other, whereby performance of a motor can be stabilized.

FIG. 2 is a cross-sectional view, FIGS. 3A, 3B, 3C and 3D show cross-sectional views taken along the line A—A in FIG. 2, and FIGS. 3E, 3F, 3G and 3H show cross-sectional views taken along the line B—B in FIG. 2. FIGS. 3A and 3E are cross-sectional views at the same point in time, FIGS. 3B and 3F are cross-sectional views at the same point in time, FIGS. 3C and 3G are cross-sectional views at the same point in time, and FIGS. 3D and 3H are cross-sectional views at the same point in time.

Next, an operation of the step motor will be described. When by energizing the coils 2 and 3 from states shown in FIGS. 3A and 3E, the outer magnetic poles 18a, 18b, 18c, 18d, and 18e of the first stator 18 are excited to the N poles, the opposed portions 21a, 21b, 21c, 21d, and 21e of the first auxiliary yoke 21 forming a part of the first inner magnetic poles are excited to the S poles, the outer magnetic poles 19a, 19b, 19c, 18d, and 19e of the second stator 19 are excited to the N poles, and the opposed portions 22a, 22b, 22c, 22d, and 22e of the second auxiliary yoke 22 forming a part of the second inner magnetic poles are excited to the S poles, the magnet 1 that is a rotor is rotated counterclockwise by 18 degrees and exhibits states shown in FIGS. 3B and 3F.

Then, when by reverse energization of coil 2, the outer magnetic poles 18a, 18b, 18c, 18d, and 18e of the first stator 18 are excited to the S poles, the opposed portions 21a, 21b, 21c, 21d, and 21e of the first auxiliary yoke 21 forming a part of the first inner magnetic poles are excited to the N poles, the outer magnetic poles 19a, 19b, 19c, 18d, and 19e of the second stator 19 are excited to the N poles, and the opposed portions 22a, 22b, 22c, 22d, and 22e of the second auxiliary yoke 22 forming a part of the second inner magnetic poles are excited to the S poles, the magnet 1 that is a rotor is further rotated counterclockwise by 18 degrees and exhibits states shown in FIGS. 3C and 3G.

Then, when by reverse energization of coil 3, the outer magnetic poles 18a, 18b, 18c, 18d, and 18e of the first stator 18 are excited to the S poles, the opposed portions 21a, 21b, 21c, 21d, and 21e of the first auxiliary yoke 21 forming a part of the first inner magnetic poles are excited to the N poles, the outer magnetic poles 19a, 19b, 19c, 18d, and 19e of the second stator 19 are excited to the S poles, and the opposed portions 22a, 22b, 22c, 22d, and 22e of the second auxiliary yoke 22 forming a part of the second inner magnetic poles are excited to the N poles, the magnet 1 that is a rotor is further rotated counterclockwise by 18 degrees and exhibits states shown in FIGS. 3D and 3H.

After that, by sequentially changing the directions of energization of coils 2 and 3 as mentioned above, the magnet 1 that is a rotor is rotated to a position corresponding to the energization phase.

Next, Example 2 of the present invention will be described with reference to FIG. 5 and FIG. 6. The same portions as in Example 1 will be denoted as the same reference numerals. The concrete descriptions are omitted. In Example 2, to reduce the working noises a contact portion with a rotary shaft, which is pressurized, was formed in a spherical shape.

Figure 6:
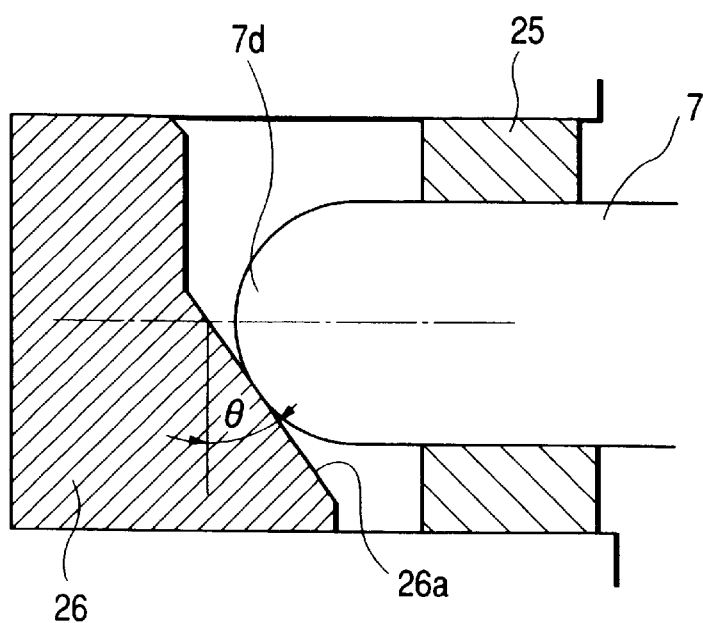
FIG. 6 is an enlarged view of a contact portion between the output shaft and the pressurizing means.
Figure 5:
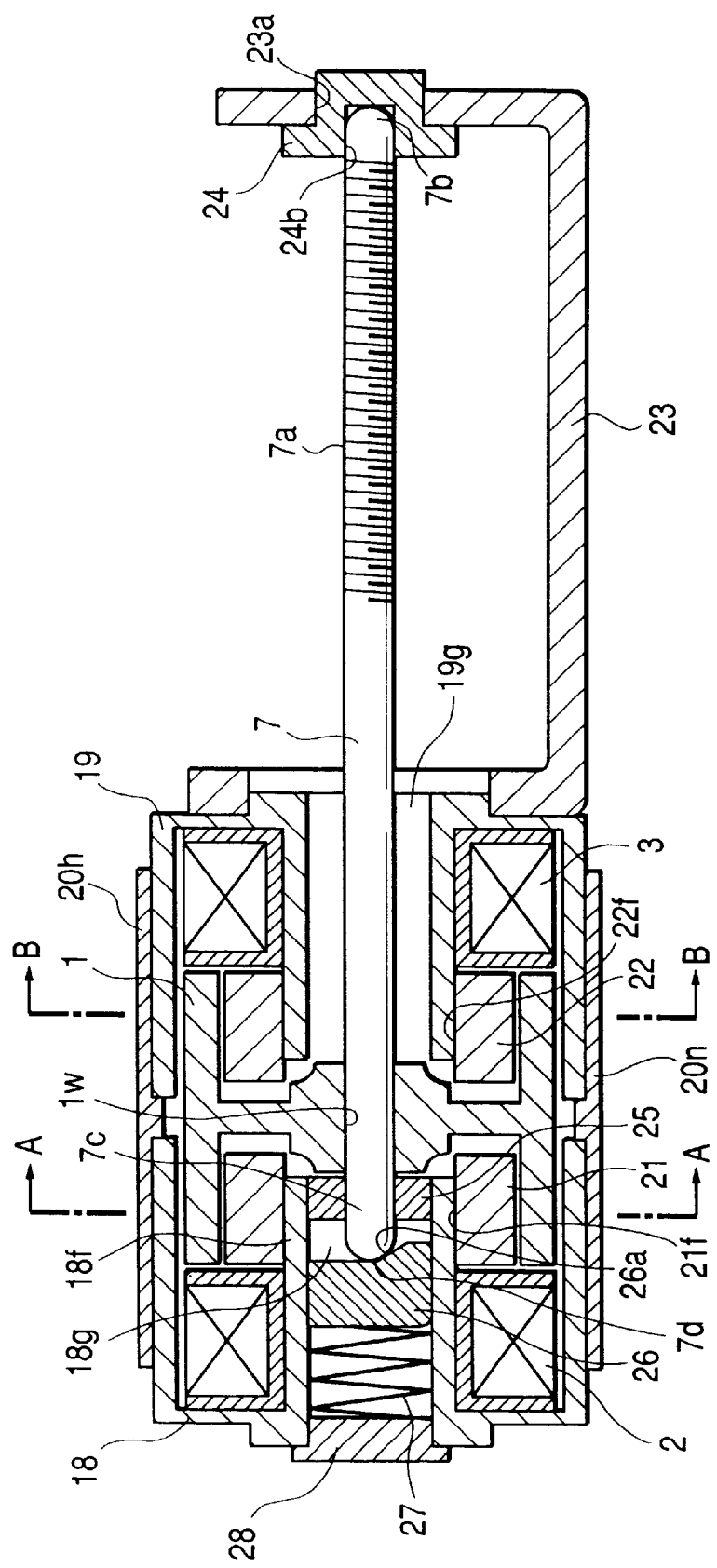
FIG. 5 is a cross-sectional view of the motor according to Example 2 of the present invention.
Figure 7:
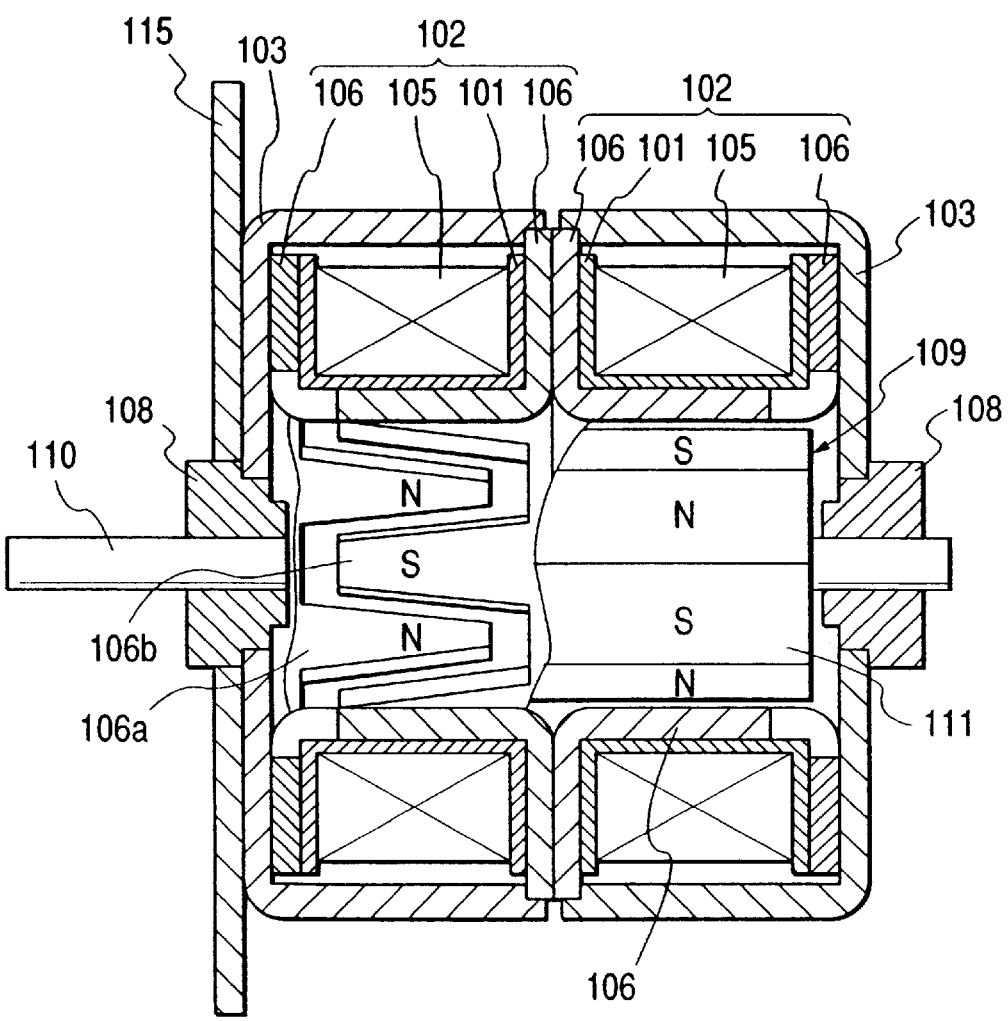
FIG. 7 is a cross-sectional vies showing a conventional step motor.
Figure 8:
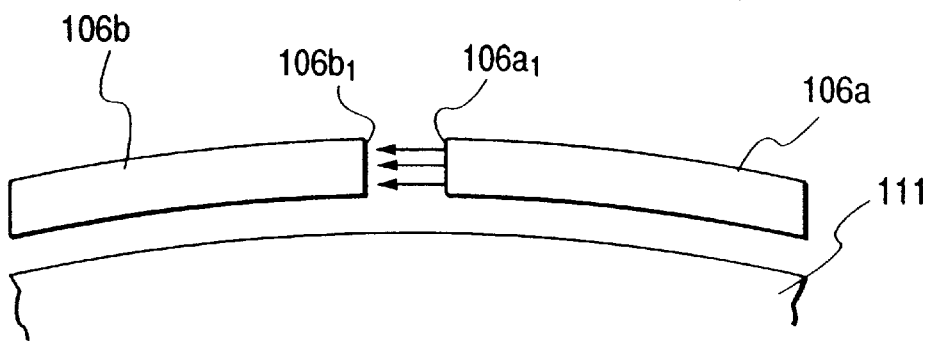
FIG. 8 is a view explaining magnetic flux of the conventional step motor shown in FIG. 7.

FIG. 5 is an exploded perspective view of a motor according to Example 2 of the present invention, and FIG. 6 is an enlarged view of the contact portion between an output shaft and a pressurizing means of FIG. 5. In FIG. 5, the reference numeral 28 denotes a lid, which is fixed to the first stator 18 and regulates a position in a direction on one side of a compression coil spring 27. On an end surface of a slide member 26 is formed an inclined surface 26a forming an angle θ with respect to a plane vertical to the axial direction of the rotor shaft 7. Therefore, the rotor shaft 7 has a structure that receives a thrust force and a radial force by pressure of the slide member 26.

An enlarged view of the contact portion is shown in FIG. 6. A compression coil spring 27 pressurizes an end portion 7d of the rotor shaft 7 in the axial direction through said slide member 26. By this pressurization the rotor shaft 7 receives the thrust force and the radial force due to pressure from the inclined surface 26a of the slide member 26.

The rotor shaft 7 is rotatably pressurized against an leading end bearing 24 side by thrust pressurization and is registered with respect to a position in the axial direction. Accordingly, the movement position of a linear motion of a female thread, which engages with the leadscrew portion 7a of the rotor shaft 7, is moved stably so that a hysteresis difference, due to the rotary direction of rotor shaft 7 or the like, does not occur. Further, looseness between a stator inner bearing 25 and a portion 7c of the rotor shaft 7 can be reduced and working noises are also reduced. In the present embodiment, a pressurizing means is composed of the compression coil spring 27 and the slide member 26. Since this pressurizing means is mounted on the inner portion 18g of the hollow cylindrical inner case 18f of the first stator 18, it does not protrude from the motor body or lose compactness of motor. Further, if, after mounting the compression coil spring 27 and the slide member 26 on the inner portion 18g of the hollow cylindrical inner case 18f of the first stator 18, the stator inner bearing 25 and the lid 28 are fixed to the first stator 18, movement of the compression coil spring 27 and the slide member 26 is regulated with the stator inner bearing 25 even before assembly of the rotor shaft 7 and does not exit the inner portion 18g of the hollow cylindrical inner case of the first stator 18, whereby a merit of enhancing the working efficiency during assembly can be obtained.

Now, the fact that the thus formed step motor has the best configuration in allowing a motor to become ultra-compact will be described.

The basic configurations of a step motor are as follows:

First, a magnet is formed in a hollow cylindrical shape;

Second, an outer surface of the magnet is divided into n parts to alternately polarize the n parts to different poles;

Third, a first coil, a magnet and a second coil are arranged in the axial direction of the magnet in this order;

Fourth, outer magnet poles and inner magnet poles of the first and second stators, which are excited with the first and second coils respectively, are opposed to the outer periphery and the inner periphery of the magnet;

Fifth, outer magnetic poles are formed of cutouts and teeth extended in a direction parallel to the axis;

Sixth, a pressurizing means for pressurizing a rotor shaft 7 in the axial direction thereof is mounted on an inner portion 18g of a hollow cylindrical inner case of, whereby projection of the pressurizing means from the motor body is not prevented; and Seventh, an end surface of said pressurizing means is formed so as to have an inclined surface thereby pressurize the rotor shaft 7 in both thrust and radial directions simultaneously.

Thus, the diameter of the step motor may have only a size sufficient to allow a diameter of magnet to oppose a stator magnet pole, and length of the step motor may have only the length obtained by the addition of lengths of the first and second coils to length of the magnet. Thus, the size of a step motor is determined by the diameter and length of the magnet and the coil. Accordingly, if the diameter and length of the magnet and the coil are decreased significantly, the step motor can be formed in an ultra-compact shape.

If the diameter and length of the magnet and the coil are decreased significantly, respectively, maintenance of the accuracy of a step motor becomes impossible. However, the problem of the accuracy of step motor is solved by such a simple structure that the outer magnetic poles and the inner magnetic poles of the first and second stators are opposed to the outer periphery and the inner periphery of the magnet. In this case, if not only the outer periphery of the magnet but also the inner periphery of the magnet are divided into parts in the circumferential direction and polarize the parts, the output of motor can be further increased.

Further, simultaneous pressurization of a rotor shaft in the thrust and radial directions by forming an inclined surface on an end surface of the pressuring means reduces working noises and looseness in the thrust direction in a simple structure.

As described-above in detail, according to the present invention, a motor is formed in such a manner that a magnet formed in a cylindrical shape and divided into n parts in the circumferential direction in the outer periphery and then polarized alternately in the n parts to different poles is provided, a first coil, said magnet and a second coil are placed in the axial direction of said magnet, a first outer magnet pole and a first inner magnet pole excited with said first coil are opposed to the outer periphery and the inner periphery of an one end side of the magnet, and a second outer magnet pole and a second inner magnet pole excited with said second coil are opposed to the outer periphery and the inner periphery of the other end side of said magnet. Therefore, according to the present invention, a motor having a completely new configuration different from a conventional motor can be obtained. The configuration of the invention is the best in forming a motor in an ultra-compact shape.

Further, an effective output for a motor can be obtained by forming a magnet in a hollow cylindrical shape and opposing the first and second outer magnetic poles and inner magnetic poles on the outer periphery and the inner periphery of the magnet formed in the hollow cylindrical shape.

Further, the magnet 1 is made of a plastic magnet material formed by injection molding. Accordingly, the radial thickness of the cylindrical magnet can be formed in a significantly thin level. Thus, the distance between the outer magnetic poles 18a and 18b and the inner magnetic poles 18c and 18d of the first stator 18 can be significantly decreased, and magnetic resistance in a magnetic circuit formed by the coil 2 and the first stator 18 can be decreased. Also, the distance between the outer magnetic poles 19a and 19b and the inner magnetic poles 19c and 19d of the second stator 19 can be significantly decreased, and magnetic resistance in a magnetic circuit formed by the coil 3 and the second stator 19 can be decreased. Accordingly, a decreased current enables generation of a large amount of magnetic flux, whereby an increased output of a motor, low power consumption and miniaturization of a coil can be attained.

The output shaft 7 is fixed to a fitting portion 1w of the magnet 1 that is a rotor by press-fitting. Since the magnet 1 is composed of a plastic magnet formed by injection molding, a crack does not occur even by assembly by press-fitting. Further, even such a complicated shape of the magnet 1 as to have the contact portion 1w having a small diameter can be easily produced. Further, since the output shaft 7 and the magnet 1 are assembled and fixed to each other, assembly thereof is easy and they can be produced at low cost.

The thrust and radial looseness for the rotor shaft 7 can be removed with a pressurizing means for pressurizing the rotor shaft 7 in the axial direction. By removing the thrust looseness for rotor shaft 7, the movement position of a linear motion of a female thread, which engages with the lead-screw portion 7a of the rotor shaft 7, is moved stably so that a hysteresis difference, due to the rotary direction of rotor shaft 7 or the like, does not occur. Further, by removing the radial looseness for rotor shaft 7, working noises can be reduced. In this case, since a pressurizing means composed of the compression coil spring 27 and the slide member 26 is mounted on the inner portion 18g of the hollow cylindrical inner case 18f of the first stator 18, it does not protrude from the motor body or lose a compactness of motor. Further, by forming an inclined surface on an end surface of the slide member 26 and forming a spherical surface on a end surface of the rotor shaft 7 which contacts the inclined surface, thrust and radial forces can be imparted to the rotor shaft in a very simple configuration. Further, if, after mounting the compression coil spring 27 and the slide member 26 on the inner portion 18g of the hollow cylindrical inner case 18f of the first stator 18, the stator inner bearing 25 and the lid 28 are fixed to the first stator 18, movement of the compression coil spring 27 and the slide member 26 is regulated with the stator inner bearing 25 even before assembly of the rotor shaft 7 and does not exit the inner portion 18g of the hollow cylindrical inner case of the first stator 18, whereby a merit of enhancing the working efficiency during assembly can be obtained.

Further, even if the pressurizing means composed of the compression coil spring 27 and the slide member 26 imparted a side pressure to the rotor shaft 7 without pressurizing the rotor shaft 7 correctly in the axial direction, a portion of the rotor shaft 7, which is pressurized, is supported with the stator inner bearing 25 in the vicinity of the portion. Accordingly, generation of a moment of force due to the side pressure can be prevented to a low level and looseness for the rotor shaft and a side pressure imparted to a bearing and the like can be prevented to minimum, whereby an output of the motor can be stabilized and generation of working noises can be decreased.

What is claimed is:

1. A motor comprising:

a magnet formed in a cylindrical shape and alternately polarized to different poles in the circumferential direction in at least the outer periphery;

a first coil and a second coil provided in the axial direction of said magnet;

a first outer magnetic pole excited by said first coil, said first outer magnetic pole being opposed to an outer periphery of one end side of said magnet;

a hollow-shaped first inner magnetic pole excited by said first coil, said first inner magnetic pole being opposed to an inner periphery of one end side of said magnet;

a second outer magnetic pole excited by said second coil, said second outer magnetic pole being opposed to an outer periphery of the other end side of said magnet;

a hollow-shaped second inner magnetic pole excited by said second coil, said second inner magnetic pole being opposed to an inner periphery of the other end side of said magnet;

a rotatable rotary shaft integral with said magnet;

a first bearing portion provided in the hollow-shaped portion of said first inner magnetic pole and supporting one end side of said rotary shaft;

a second bearing portion for supporting the other end side of said rotary shaft projected in the axial direction beyond the hollow-shaped portion of said second inner magnetic pole; and a pressurizing means for pressurizing one end of said rotary shaft in the axial direction, said pressurizing means being provided in the hollow-shape portion of said first inner magnetic pole.

2. A motor comprising:

a magnet formed in a cylindrical shape and alternately polarized to different poles in the circumferential direction in at least the outer periphery;

a first coil and a second coil provided in the axial direction of said magnet;

a first outer magnetic pole excited by said first coil, said first outer magnetic pole being opposed to an outer periphery of one end side of said magnet;

a first inner magnetic pole excited by said first coil, said first inner magnetic pole being opposed to an inner periphery of one end side of said magnet;

a second outer magnetic pole excited by said second coil, said second outer magnetic pole being opposed to an outer periphery of the other end side of said magnet;

a second inner magnetic pole excited by said second coil, said second inner magnetic pole being opposed to an inner periphery of the other end side of said magnet, and said second inner magnetic pole and said first inner magnetic pole having a hollow-shaped portion in any one of said second inner magnetic pole and said first inner magnetic pole;

a rotatable rotary shaft integral with said magnet; and a pressurizing means for pressurizing said rotary shaft in the axial direction, said pressurizing means being provided in a hollow-shape portion of any one of said first inner magnetic pole and said second inner magnetic pole.

3. The motor according to claim 2, wherein said first inner magnetic pole and said second inner magnetic pole have said hollow-shaped portion, respectively, the one end side of said rotary shaft is positioned at said hollow-shaped portion of said first inner magnetic pole, and the other end side of said rotary shaft is positioned at said hollow-shaped portion of said second inner magnetic pole.

4. The motor according to claim 3, wherein said hollow-shaped portion of said first inner magnetic pole is provided with said pressurizing means for pressurizing one end of said rotary shaft and the other end of said rotary shaft is projected beyond said hollow-shaped portion of said second inner magnetic pole in the axial direction.

5. The motor according to claim 4, wherein said pressurizing means has a spring and a slide member for pressurizing one end of said rotor shaft by receiving a bias force of said spring.

6. The motor according to claim 2, wherein a contact portion of said rotary shaft pressurized with said pressurizing means is formed in a spherical shape, said contact portion of said rotary shaft formed in the spherical shape being pressurized in a direction forming a predetermined angle with respect to the axial direction with said pressurizing means.

7. A motor comprising:

a magnet formed in a cylindrical shape and alternately polarized to different poles in the circumferential direction in at least the outer periphery;

a first coil and a second coil provided in the axial direction of said magnet;

a first outer magnetic pole excited by said first coil, said first outer magnetic pole being opposed to an outer periphery of one end side of said magnet;

a hollow-shaped first inner magnetic pole excited by said first coil, said first inner magnetic pole being opposed to an inner periphery of one end side of said magnet;

a second outer magnetic pole excited by said second coil, said second outer magnetic pole being opposed to an outer periphery of the other end side of said magnet;

a hollow-shaped second inner magnetic pole excited by said second coil, said second inner magnetic pole being opposed to an inner periphery of the other end side of said magnet;

a rotatable rotary shaft integral with said magnet;

a bearing portion provided in the hollow-shaped portion of said first inner magnetic pole and supporting said rotary shaft; and a pressurizing means for pressurizing said rotary shaft in the axial direction, said pressurizing means being provided in the hollow-shape portion of said first inner magnetic pole.

8. The motor according to claim 7, wherein said bearing portion of said first inner magnetic pole is formed so that movement of said pressurizing means in the axial direction of said rotary shaft can be regulated.

9. The motor according to claim 8, wherein said pressuring means pressurizes one end of said rotary shaft and the other end of said rotary shaft is projected in the axial direction beyond the hollow-shaped portion of said second inner magnetic portion.

10. The motor according to claim 9, wherein another bearing portion for supporting the other end of said rotary shaft is provided, and the other end side of said rotary shaft is provided with a transmission means for transmitting power to the outside.

11. The motor according to claim 7, wherein a contact portion of said rotary shaft pressurized with said pressurizing means is formed in a spherical shape, said contact portion of said rotary shaft formed in the spherical shape being pressurized in a direction forming a predetermined angle with respect to the axial direction with said pressurizing means.

12. The motor according to claim 11, wherein a contact surface of said pressurizing means with the contact portion of said rotary shaft is formed with an inclined surface forming a predetermined angle with respect to a plane vertical to the axial direction of said rotary shaft.

* * * * *

UNITED STATES PATENT AND TRADEMARK OFFICE
CERTIFICATE OF CORRECTION

PATENT NO.    : 6,255,749 B1
DATED         : July 3, 2001
INVENTOR(S)   : Chikara Aoshima et al.

It is certified that error appears in the above-identified patent and that said Letters Patent is hereby corrected as shown below:

<u>Column 10,</u>
Line 43, "claim 14," should read -- claim 16 --.

Signed and Sealed this

Twenty-ninth Day of October, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,255,749 B1
DATED : July 3, 2001
INVENTOR(S) : Chikara Aoshima et al.

It is certified that error appears in the above-identified patent and that said Letters Patent is hereby corrected as shown below:

Column 1,
Line 36, "106a 1" should read -- 106a1 --.

Column 2,
Line 43, "vies" should read -- view --.
Line 55, "FIGS." should read -- to FIGS. --.

Column 3,
Line 39, "numerals" should read -- numeral --.
Line 60, "numerals" should read -- numeral --.

Column 4,
Line 53, "said" should read -- the --.
Line 54, "coil" should read -- the coil -- (second occurrence).

Column 6,
Line 16, "prevented to minimum," should read -- prevented or minimized --.
Line 33, "said" should read -- the --.
Line 35, "coil" should read -- the coil --.
Line 43, "motor." should read -- the motor. --.
Line 46, "is" should read -- are --.

Column 7,
Line 20, "18d," should read -- 19d, --.
Line 32, "18d," should read -- 19d, --.
Line 44, "18d," should read -- 19d, --.

Column 8,
Line 58, "case of," should read -- case thereof --.

Column 9,
Line 11, "step" should read -- a step --.
Line 24, "described-above" should read -- above-described --.

Column 10,
Line 21, "a end" should read -- an end --.

UNITED STATES PATENT AND TRADEMARK OFFICE
CERTIFICATE OF CORRECTION

PATENT NO.     : 6,255,749 B1
DATED          : July 3, 2001
INVENTOR(S)    : Chikara Aoshima et al.

It is certified that error appears in the above-identified patent and that said Letters Patent is hereby corrected as shown below:

<u>Column 11,</u>
Line 11, "hollow-shape" should read -- hollow-shaped --.
Line 58, "rotar" should read -- rotary --.

<u>Column 12,</u>
Line 32, "hollow-shape" should read -- hollow-shaped --.

This certificate supersedes Certificate of Correction issued October 22, 2002. The certificate should not have been issued.

Signed and Sealed this

Seventeenth Day of December, 2002

JAMES E. ROGAN
*Director of the United States Patent and Trademark Office*